US 12,257,986 B2

United States Patent
Howell

(10) Patent No.: US 12,257,986 B2
(45) Date of Patent: Mar. 25, 2025

(54) SHARED RESERVOIR FOR SERVICE BRAKE CIRCUITS

(71) Applicant: Bendix Commercial Vehicle Systems LLC, Avon, OH (US)

(72) Inventor: David W. Howell, Oak Ridge, NC (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 466 days.

(21) Appl. No.: 17/899,129

(22) Filed: Aug. 30, 2022

(65) Prior Publication Data

US 2024/0067147 A1 Feb. 29, 2024

(51) Int. Cl.
*B60T 11/32* (2006.01)
*B60T 17/02* (2006.01)
*B60T 17/18* (2006.01)

(52) U.S. Cl.
CPC ............. *B60T 11/326* (2013.01); *B60T 17/02* (2013.01); *B60T 17/18* (2013.01)

(58) Field of Classification Search
CPC .......... B60T 13/26; B60T 17/00; B60T 17/02; B60T 17/18; B60T 13/263; B60T 13/268; B60T 15/48; B60T 17/06; B60T 17/22; B60T 2270/402
USPC .................................................. 303/5, 9, 71
See application file for complete search history.

(56) References Cited

U.S. PATENT DOCUMENTS

| | | | |
|---|---|---|---|
| 4,071,284 A | 1/1978 | Masclet et al. | |
| 4,673,222 A * | 6/1987 | Knight | B60T 13/263 303/71 |
| 6,149,246 A * | 11/2000 | Terborn | B60T 17/06 280/124.16 |
| 6,276,761 B1 | 8/2001 | Beck | |
| 7,866,760 B2 | 1/2011 | Detlefs et al. | |
| 2007/0188016 A1* | 8/2007 | Soupal | B60T 15/18 303/69 |
| 2010/0125398 A1* | 5/2010 | Headlee | B60T 13/586 180/65.265 |

OTHER PUBLICATIONS

"Bendix® AD-HF® (High Flow) and AD-HFi™ (High Flow Intelligent) PuraGuard® Oil Coalescing Air Dryer"; Service Data Sheet SD-08-12046; Bendix Commercial Vehicle Systems LLC, Jan. 2022; 18 pages.
"Bendix® AD-IS® & AD-IS® PuraGuard® (Oil Coalescing) Air Dryer & Reservoir Systems"; Service Data Sheet SD-08-2418; Bendix Commercial Vehicle Systems LLC, Apr. 2018; 16 pages.

(Continued)

*Primary Examiner* — Robert A. Siconolfi
*Assistant Examiner* — San M Aung
(74) *Attorney, Agent, or Firm* — Crowell & Moring LLP

(57) ABSTRACT

When a leak occurs in one service circuit of a multi-circuit braking system, the leak can prevent replenishing the non-leaking service reservoir. To address this problem, a shared backup reservoir can be used to replenish the non-leaking service reservoir. A valve can be used to allow flow from the backup reservoir to whichever service reservoir is under higher pressure, as low pressure would indicate a leak. Additional valve(s) can be used to impede flow from the service reservoirs to the backup reservoir to prevent the service reservoirs from being drained if the backup reservoir is subject to a leak.

20 Claims, 5 Drawing Sheets

(56) References Cited

OTHER PUBLICATIONS

"Bendix® PR-2™, PR-3™ & PR-4™ Pressure Protection Valves"; Service Data Sheet SD-03-2010; Bendix Commercial Vehicle Systems LLC, Oct. 2018; 4 pages.
"Bendix® SS-1™ Shut-Off Valve"; Service Data Sheet SD-03-4010; Bendix Commercial Vehicle Systems LLC, Jan. 2006; 4 pages.

* cited by examiner

✻ = Pressure Protection Valve w/
Reverse Free Flow
(Back toward Primary/Secondary)

SHARED RESERVOIR FOR SERVICE BRAKE CIRCUITS

BACKGROUND

Some vehicles use a multi-circuit braking system, where different service reservoirs provide pressurized air to braking components on different axles of the vehicle. In operation, an air compressor fills a supply reservoir with pressurized air, and the supply reservoir supplies the pressurized air to the service reservoirs. When a driver presses the brake pedal, pressurized air is sent from the service reservoirs to various braking components to decelerate the vehicle. The supply reservoir replenishes pressurized air in the service reservoirs, and the air compressor replenishes pressurized air in the supply reservoir.

SUMMARY

The following embodiments generally relate to a shared reservoir for service brake circuits. In one embodiment, a braking sub-system is provided comprising a first air reservoir coupled with a first braking circuit of a vehicle, a second air reservoir coupled with a second braking circuit of the vehicle, an air supply reservoir coupled with the first and second air reservoirs, and a backup air supply reservoir coupled with the first and second air reservoirs via a valve. The valve is configured to provide air from the backup air supply reservoir to whichever one of the first and second air reservoirs contains air under a higher pressure.

In another embodiment, a method is provided that is performed in a braking sub-system comprising a first service brake tank, a second service brake tank, a source of air pressure, and a backup tank. The method comprises detecting a loss of pressure in one of the first and second service brake tanks which renders the source of air pressure incapable of replenishing the other of the first and second service brake tanks; and allowing the backup tank to provide additional air to the other of the first and second service brake tanks.

In yet another embodiment, a braking sub-system is provided comprising a backup reservoir configured to be shared by primary and secondary reservoirs that are couplable with respective primary and secondary braking circuits of a vehicle; and means for placing the backup reservoir in fluidic communication with only one of the primary and secondary reservoirs when the other of the primary and secondary reservoirs is subject to a leak.

Other embodiments are possible, and each of the embodiments can be used alone or together in combination.

DETAILED DESCRIPTION

Figure 1A:
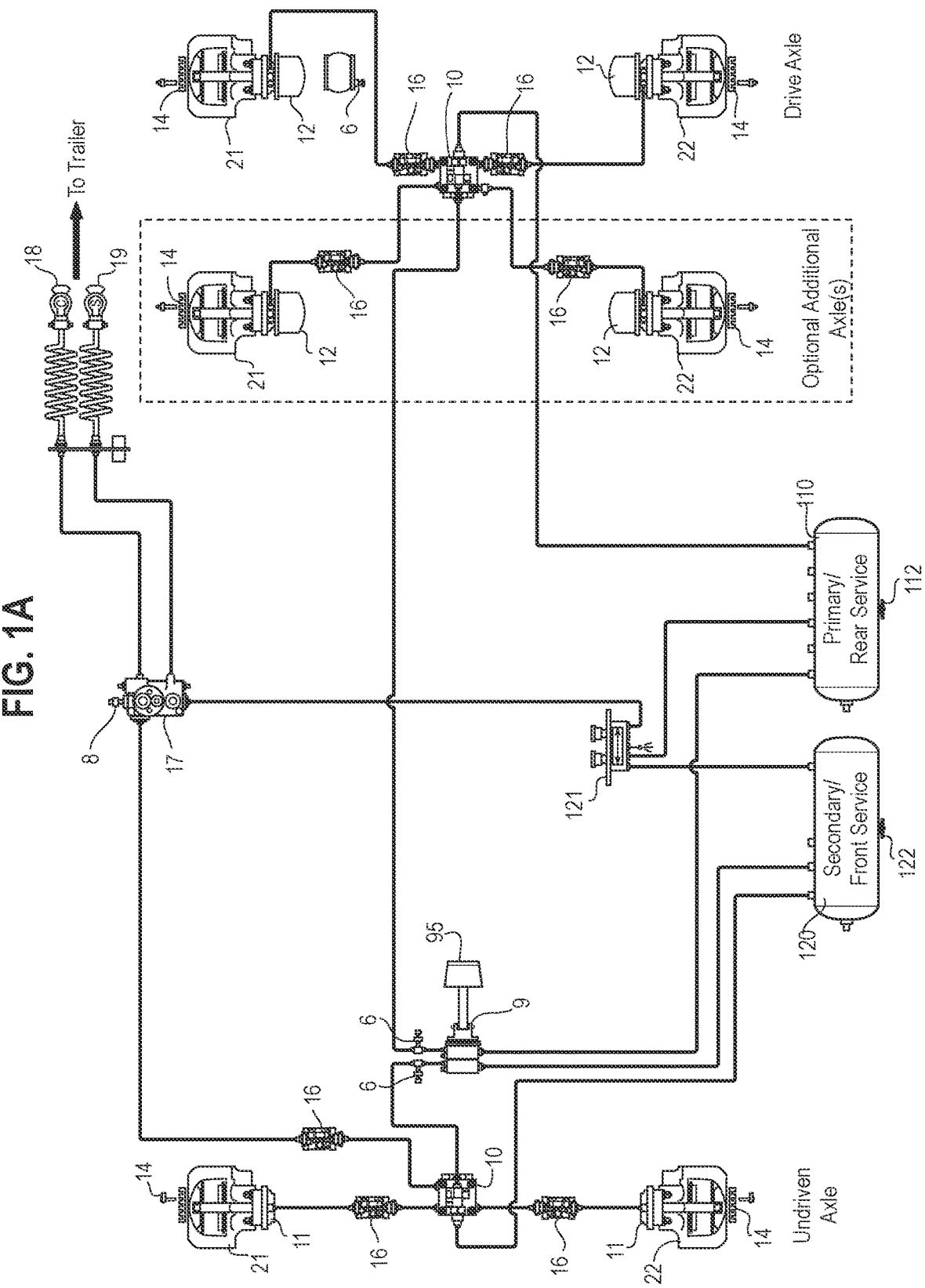
FIG. 1A is a diagram of a braking system of an embodiment.

Turning now to the drawings, FIG. 1A is a diagram of a two-circuit pneumatic braking system of a vehicle of an embodiment. In this example, the vehicle is a tractor, but any suitable type of vehicle (e.g., a truck, bus, etc.) can be used. It should be understood that this diagram is merely an example and that additional or different components can be used. Accordingly, the details shown in this diagram should not be read into the claims unless expressly recited therein.

As shown in FIG. 1A, the tractor in this embodiment has a rear drive axle, a front undriven (steer) axle, and one or more optional axles. In this embodiment, the drive, undriven, and optional axles have various components that can be used to decelerate the tractor. For example, as shown in FIG. 1A, the drive, undriven, and optional axles in this embodiment each comprise a traction relay valve 10, a service brake actuator 11 on each braked wheel end, a parking brake actuator 12 on the driven axle(s), at least one wheel speed sensor 14, at least one anti-lock brake modulator 16, and friction brakes, such as an air disc caliper 21, 22 on each braked wheel end. Again, different components can be used.

In operation, when a driver presses the brake pedal 95, a dual-circuit foot valve 9 receives pneumatic pressure from a primary (rear service) compressed air reservoir 110 and a secondary (front service) compressed air reservoir 120. (The primary and secondary reservoirs 110, 120 are sometimes referred to herein as "service reservoirs" or "pressurized air reservoirs"). The secondary reservoir 120 provides proportional pneumatic pressure to the braking component of the undriven/steer axle through the foot valve 9, while the primary reservoir 110 provides proportional pneumatic pressure to the braking component of the driven axle and optional axle(s), if present, through the foot valve 9. These proportional supplies of pressurized air are controlled by the driver's press on the brake pedal 95. The pressure sensor 6 measures pressure at the control lines from the foot valve 9. Accordingly, the braking system of this embodiment has two isolated braking circuits one providing braking of the drive axle and optional axle(s) in the rear axle group and another providing braking in the steer axle of front axle group (again, other configurations are possible). By having two isolated pneumatic braking circuits, if there is a failure in one of the braking circuits (a single-point failure), braking may not be able to occur on one of the axles, but the vehicle can be decelerated based on braking of the other axle using the other braking circuit. While two braking circuits are shown in FIG. 1, more than two circuits can be used. Further, it should be understood that "primary" and "secondary" (which are sometimes referred to herein as "first" and "second") do not necessarily denote a priority or a sequence. Rather, those terms are used merely to distinguish one braking circuit from the other.

The tractor can be used to tow a trailer, which can have its own braking system that can also be controlled by the brake pedal 95 of the tractor. In the embodiment shown in FIG. 1A, the trailer's braking system is a pure pneumatic braking system, and a multiplexor valve 121 provides the greater of the pneumatic pressures from the primary and secondary reservoirs 110, 120 to a tractor protection valve 17. The tractor protection valve 17 provides protected and isolated supply and control air signals to a trailer control coupling 18 and a trailer supply coupling 19. The pneumatic pressure is also supplied to a stop light switch 8 to illuminate a brake light.

Figure 1B:
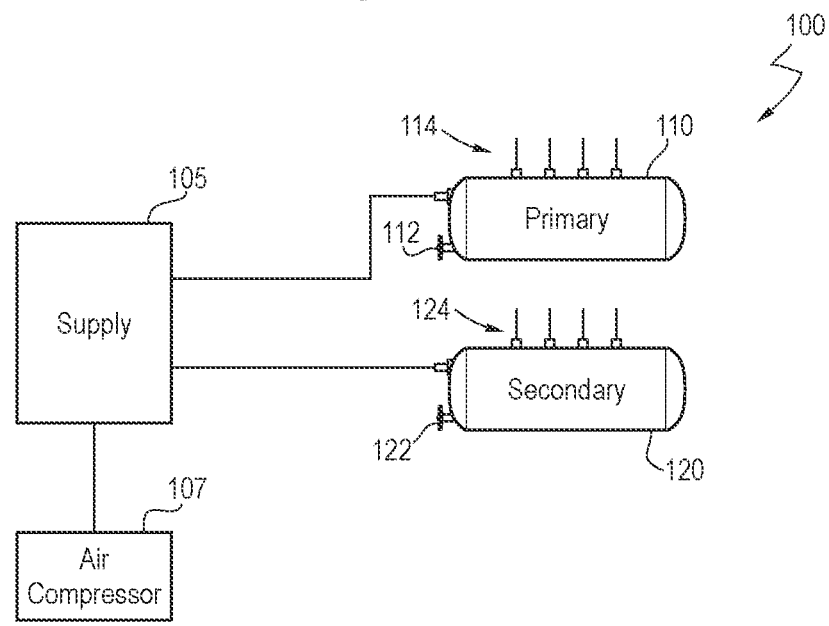
FIG. 1B is a diagram of a braking sub-system of an embodiment.

FIG. 1B is a diagram of a sub-system 100 of the braking system shown in FIG. 1A. This sub-system 100 contains the primary and secondary reservoirs 110, 120 and air supply lines 114, 124. The air supply lines 114, 124 represent pneumatic connections that provide pressurized air to various systems (braking and potentially others) in the vehicle. While FIG. 1B shows four air supply lines 114, 124 from each reservoir 110, 120, any suitable number can be used. This sub-system 100 also contains a supply reservoir/tank 105 (sometimes referred to herein as a "pressurized air supply reservoir") and an air compressor 107, which were not shown in FIG. 1A to simplify the drawing. In operation, the air compressor 107 (which can be run by the engine of the vehicle or by a separate motor) fills the supply reservoir 105 with compressed air, and the supply reservoir 105 supplies the pressurized air to the primary and secondary reservoirs 110, 120 (initially, to fill the reservoirs 110, 120 and then to replenish them as the reservoirs 110, 120 release pressurized air to provide braking). As the supply reservoir 105 supplies compressed air to the primary and secondary reservoirs 110, 120, the air compressor 107 can replenish compressed air to the supply reservoir 105. For example, a processor/controller in the vehicle can set cut-in/cut-out pressures in the supply reservoir 105 to cause the air compressor 107 to engage/disengage.

In some environments, an air dryer external to or integrated with the supply reservoir 105 can be used to remove moisture from the air. Example of air dryers include a Bendix® AD-IS® Air Dryer and Reservoir System and a Bendix® AD-HF® Air Dryer. Of course, these are merely examples, and other types of air dryers can be used. Even with the use of an air dryer, the air received by the primary and secondary reservoirs 110, 120 can contain moisture. Drain valves 112, 122 can be periodically opened by the driver of the vehicle to release moisture collected in the primary and secondary reservoirs 110, 120, so the moisture does not travel to other components of the braking system.

Although not shown in FIG. 1B to simplify the drawing, check valves and/or pressure release valves can be positioned at the supply reservoir 105 where the air supply lines leave the reservoir 105, at the primary/secondary reservoirs 110, 120 where the air supply lines enter the primary/secondary reservoirs 110, 120, and/or along the air supply lines that couple the supply reservoir 105 with the primary/secondary reservoirs 110, 120 to prevent air flow from the primary and secondary reservoirs 110, 120 back to the supply reservoir 105.

A problem can occur if one of the primary and secondary reservoirs 110, 120 is subject to significant leakage (e.g., a hole in one of the reservoirs 110, 120, in one of the supply lines 112, 122, or at a supply line connector). When such leakage occurs, air is depleted from the reservoir, eventually reducing the pressure of air in that reservoir to atmospheric pressure, which is insufficient for braking. Because the supply reservoir 105 or its air supply lines contains check valves or other devices, the primary and secondary reservoirs 110, 120 are isolated from one another. That is, if one of the primary and secondary reservoirs 110, 120 has a leak, the leak will not result in the loss of air pressure in the other reservoir. However, in most cases, this would leave the vehicle with less than half of its total storage capacity of air.

Some braking systems permit air pressure to normalize between the two service brake circuits back through a portion of the supply reservoir 105 only at high pressures considered to be the typical operating range, but the circuits still become isolated if the pressure drops below a threshold.

Even though the supply reservoir 105 contains check valves or other devices to isolate the non-leaking reservoir from the leaking one, the supply reservoir 105 is not isolated from the leaking reservoir. As such, the leak in the leaking reservoir will not only deplete the air in that reservoir but also the air in the supply reservoir 105. Depending on the size of the leak, the air compressor 107 may not be able to replenish the air depleted from the supply reservoir 105, at least not at the required pressure. So, as the air in the non-leaking reservoir is used for braking, there will not be a sufficient supply of pressurized air from the supply reservoir 105 to replenish the air in the non-leaking reservoir. As such, eventually, the non-leaking reservoir will not have enough pressurized air for braking.

One way to address this problem is to reduce the size of the supply reservoir 105 and increase the size of the primary and secondary reservoirs 110, 120. Another way to address this problem is to remove the supply reservoir 105 and just use the primary and secondary reservoirs 110, 120 at higher capacities. Government regulations can specify a minimum volume of air required in a vehicle for braking. For example, U.S. Federal Motor Vehicle Safety Standards No. 121 ("FMVSS-121") specifies that U.S. air-braked commercial powered vehicles (e.g., trucks, tractors, and buses) need a combined reservoir capacity of twelve times ("12×") the volumes of the brake chambers. Due to cost and space limitations, a typical truck has just enough reservoir capacity to meet this requirement. So, in this approach of removing the supply reservoir 105, the full 12× volume would be stored in the primary and secondary reservoirs 110, 120. Even with this approach, the primary and secondary service reservoirs 110, 120 could be sized 50%-50%; otherwise, one service circuit would contain less than half of the total storage volume. A vehicle with this style of braking system can permit the two service circuits to be common above a minimum threshold pressure, so one failed-and-drained circuit will result in the other circuit being at less than full pressure, offsetting the volume increase. If the engine or motor is still running the air compressor 107, it may be possible to partially recharge the non-failed service circuit.

Another section of the FMVSS-121 regulation requires sufficient air storage, such that, with the engine (charging system) off and one service circuit drained, the other service circuit retains sufficient air pressure and volume to apply, release, and re-apply the parking brakes. Even with 50% volume assigned to each service circuit, satisfying this regulation can be difficult for trucks with many parking brake chambers and especially if those chambers are large or require high pressure. Without exceeding the 12× volume, at a higher cost and requiring more space for storage capacity, an alternative can be used in which there is more than 50% of the air storage in the non-failed service circuit in the event of a failure in the other circuit. This alternative would shift some capacity away from the failed circuit to the non-failed circuit.

The following embodiments can be used to address these problems by providing a shared reservoir (in some embodiments, a "shared, switching storage volume;" in other embodiments, a "backup pressurized air supply reservoir"). In general, with these embodiments, a portion of the total pressurized air storage capacity in an air-braked vehicle with two or more brake service circuits is shifted between the circuits. In a vehicle where one of its service circuits failed in such a way as to lose pressure, this shared volume would be switched to connect to the non-failed circuit, preserving a larger quantity of pressurized air in the remaining functional service circuit (e.g., for emergency use and regulatory requirements). That is, if one service brake circuit were to lose pressure, the shared volume would connect with a remaining pressurized service brake circuit, increasing the quantity of preserved pressurized air. For any single pressure-loss failure, more pressurized air would remain available than without this feature.

A control system of valve(s) can connect the shared volume with whichever service brake circuit contains higher pressure and also can conserve pressure in all service brake circuits if the shared volume should develop a leak. The following paragraphs provide several example configurations that can be used. It should be noted that these are merely examples and that other implementations can be used. Accordingly, none of the details presented herein should be read into the claims unless expressly recited therein.

Figure 2:
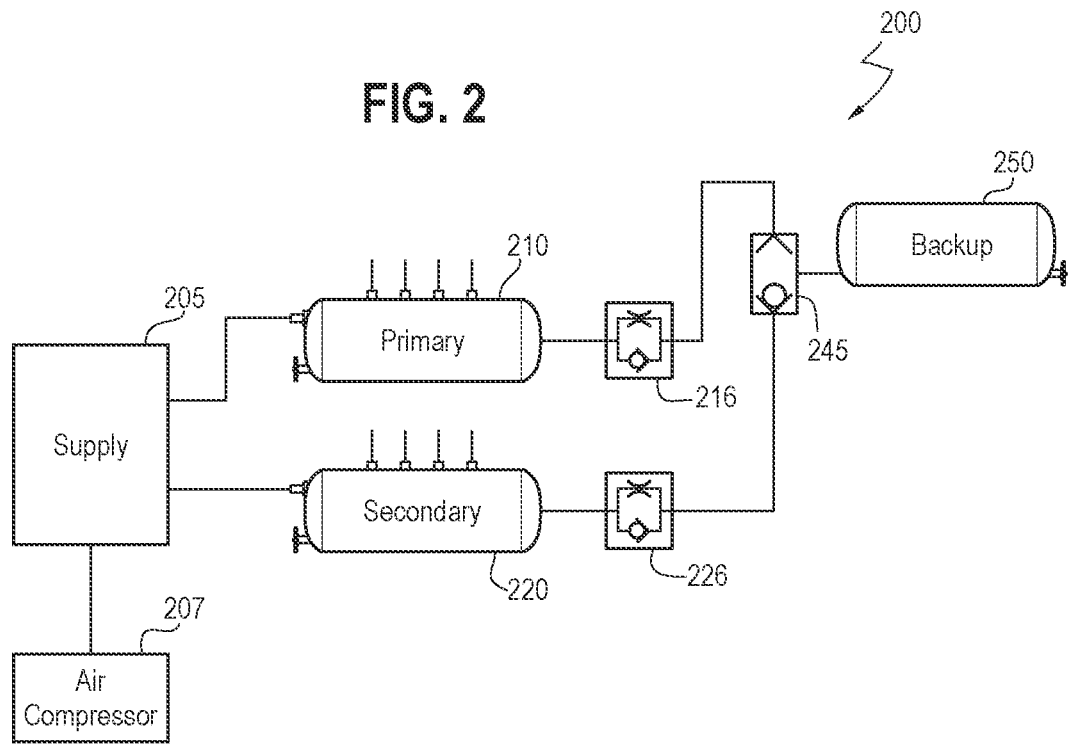
FIG. 2 is a diagram of a braking sub-system of an embodiment comprising a select-high valve and orifice check valves.

Returning to the drawings, FIG. 2 is a diagram of a braking sub-system 200 of an embodiment. Like the braking sub-system 100 of FIG. 1B, this braking sub-system 200 comprises a compressed air supply reservoir 205, an air compressor 207, a primary air reservoir 210, and a secondary air reservoir 220. (As noted above, more than two braking circuits can be used.) In addition, the braking sub-system 200 of this embodiment comprises a backup compressed air supply reservoir 250 that can supply pressurized air to one of the primary and secondary air reservoirs 210, 220 when the other encounters a leak in its braking circuit. As explained above, when one of the primary and secondary air reservoirs 210, 220 is subject to a leak (e.g., a hole in the reservoir or in one of the air supply hoses or connectors), air is depleted from that reservoir and the compressed air supply reservoir 205. As such, the compressed air supply reservoir 205 may not be capable of filling the other service reservoir to the certain pressure needed to provide braking in its braking circuit. The backup compressed air supply reservoir 250 can supply pressurized air to that other service reservoir in such a situation.

Any suitable mechanism can be used to detect a loss of pressure in one of the primary and secondary reservoirs 210, 220 and cause the backup compressed air supply reservoir 250 to supply pressurized air to the non-leaking service reservoir. For example, in the embodiment in FIG. 2, a valve 245 is used that is configured to provide pressurized air from the backup pressurized air supply reservoir 250 to whichever one of the first and second pressurized air reservoirs 210, 220 contains air under a higher pressure (the one that is under a lower pressure can be assumed to be subject to a leak), but not both at the same time. That is, the valve 245 pneumatically connects the shared backup reservoir 250 to whichever service reservoir is at higher pressure to permit flow from the shared backup reservoir 250 into that circuit while blocking flow into the service circuit containing lower or no pressure. In this way, should one of the service circuits lose pressure, the shared backup reservoir 250 will be connected to the remaining "good" (higher pressure) circuit, while isolating the shared backup reservoir 250 from the "bad" (lower pressure) circuit. So, whichever braking circuit is at higher pressure will be joined to the backup reservoir 250 to supplement the stored volume of pressurized air ("energy") in that circuit while being separated from the braking circuit that contains less pressure (and subject to a leak).

Any suitable valve can be used. For example, in one embodiment, a select-high device can be used. The select-high device can be automatic, such as a basic shuttling valve or can be a more-sophisticated control system, possibly electronic. The selection can also be manual or automatic with a manual override. Of course, these are merely examples, and other type of valves that provide a similar function can be used. In some architectures, it may be desired to mount the valve 245 horizontally to prevent gravity from biasing the operation of the valve.

Returning to FIG. 2, in this embodiment, the backup reservoir 250 is filled via the primary and secondary reservoirs 210, 220. So, a flow path from the primary and secondary reservoirs 210, 220 to the backup reservoir 250 is needed. However, if the backup reservoir 250 is subject to a leak, a problem can occur if that flow path allows air from the primary and/or secondary reservoirs 210, 220 to deplete through the leaking backup reservoir 250. To address this situation, a mechanism can be used to at least partially impede the flow from the primary and secondary reservoirs 210, 220 to the leaking backup reservoir 250. In the embodiment shown in FIG. 2, that mechanism takes the form of respective orifice check valves 216, 226. These orifice check valves 216, 226 allow pressurized air to flow to the backup reservoir 250 at a slower rate than pressurized air is allowed to flow from the backup reservoir 250 to the primary and secondary reservoirs 210, 220. This means that air will flow from the primary and secondary reservoirs 210, 220 to a leaky backup reservoir 250 relatively slowly. So, if the backup reservoir 250 does encounter a leak, these valves 216, 226 provide an impediment to the flow, meaning that air will drain from the primary and secondary reservoirs 210, 220 relatively slowly. However, eventually, air can completely drain from the primary and secondary reservoirs 210, 220 through leaking backup tank 250.

Figure 3:
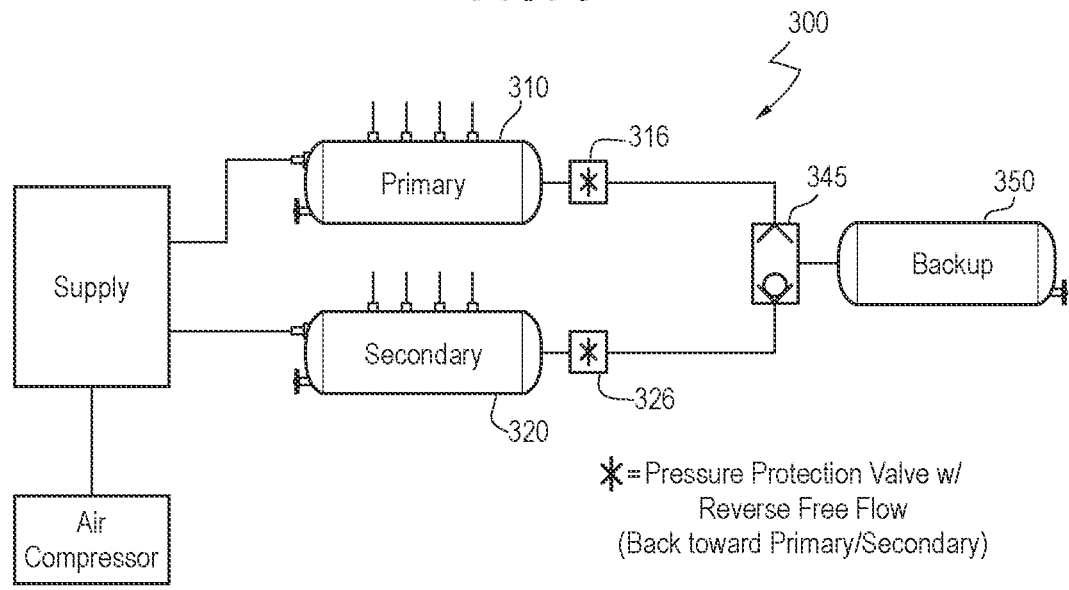
FIG. 3 is a diagram of a braking sub-system of an embodiment comprising a select-high valve and pressure protection valves.

In another embodiment (shown in the braking sub-system 300 in FIG. 3), to protect the service circuits from eventual depletion via a leak in the backup reservoir, pressure protection valves 316, 326 are used instead of orifice check valves. A pressure protection valve is open to flow when the pressure on the supply side of the valve is above a certain pressure setting and closed to flow when the pressure is lower than that certain pressure setting, with a certain amount of hysteresis between the opening setting on rising pressure and closing setting on falling pressure. Some pressure protection valves can be open or closed to bi-directional flow, while others can block reverse flow no matter the pressure (so doubling as a check valve), or permit "free" reverse flow down to a nearly zero-pressure differential. The pressure protection valves 316, 326 in this embodiment allow pressurized air to flow freely from the backup reservoir 350 to the primary and secondary reservoirs 310, 320 but allow pressurized air to flow from the primary and secondary reservoirs 310, 320 to the backup reservoir 350 only when air from those reservoirs 310, 320 is at a pressure greater than a threshold pressure. So, should a leak develop in the backup reservoir 350, this minimum threshold pressure would be maintained in each service reservoir 310, 320.

Figure 4:
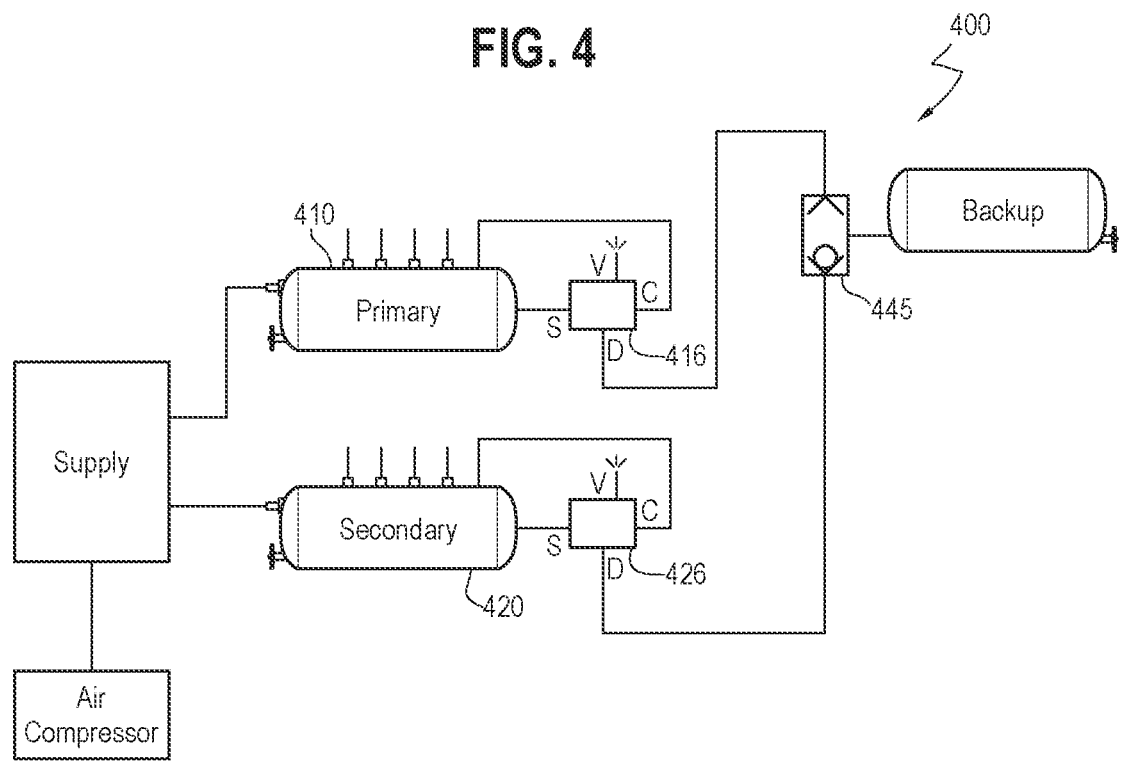
FIG. 4 is a diagram of a braking sub-system of an embodiment comprising a select-high valve and shut-off valves.

As shown in the braking sub-system 400 in FIG. 4, the pressure protection valves can take the form of reverse check valves/shut-off valves 416, 426, wherein each shut-off valve 416, 426 is controlled by a supply of pressurized air from a control line of its respective pressurized air reservoir 410, 420 as a supply (the control line can be connected via a tee between the reservoir and the supply port of the valve). An example of a shut-off valve is a Bendix® SS-1™ Valve, although any suitable type of valve can be used.

Figure 5:
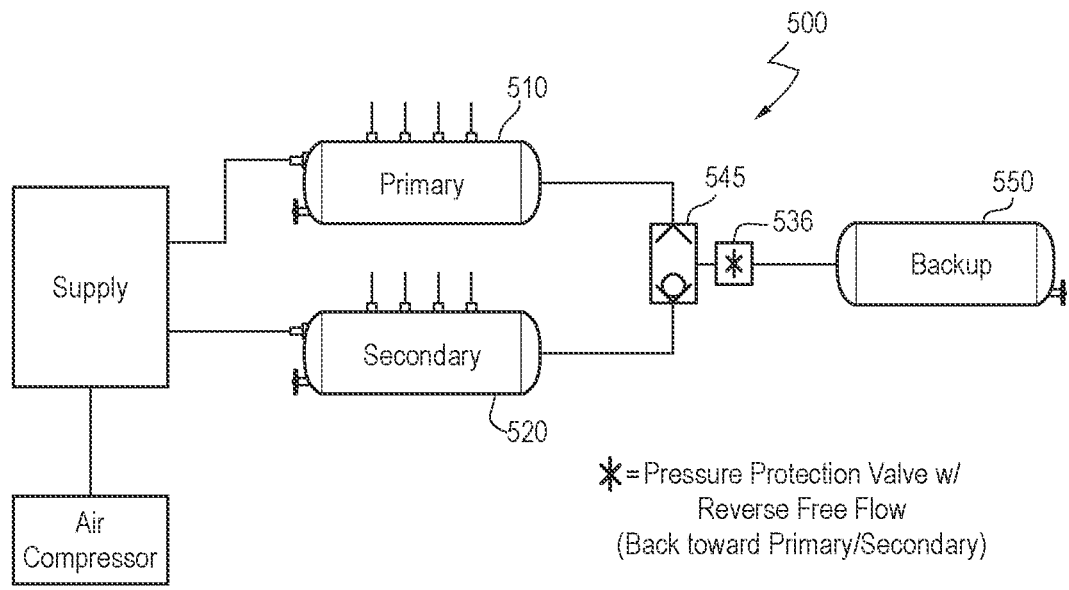
FIG. 5 is a diagram of a braking sub-system of an embodiment comprising a select-high valve and a pressure protection valve.

In another embodiment (shown in the braking sub-system 500 in FIG. 5), instead of using two pressure protection valves (one for each service reservoir), to reduce cost, a single pressure protection valve 536 can be positioned between the valve 545 and the backup pressurized air supply reservoir 550. In this configuration, the pressure protection valve 536 allows pressurized air to flow freely away from the backup reservoir 550 to the primary and secondary reservoirs 510, 520 but allow pressurized air to flow to the backup reservoir 550 from the primary and secondary reservoirs 510, 520 only in response to air pressure received by the pressure protection valve 545 exceeding a threshold pressure (to prevent the loss of air if the backup reservoir 550 is leaky).

Figure 6:
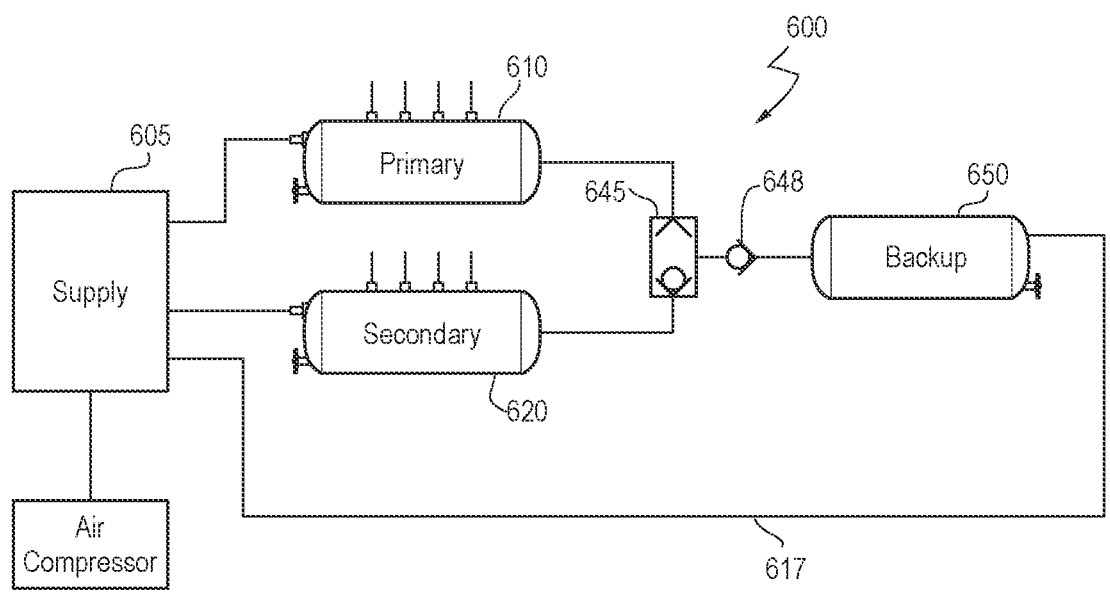
FIG. 6 is a diagram of a braking sub-system of an embodiment comprising a select-high valve and a check valve.

In the above embodiments, the backup reservoir was filled from the primary and secondary reservoirs, and a mechanism was used to protect against depleting the primary and secondary reservoirs if the backup reservoir encountered a leak. In another embodiment (shown in FIG. 6), a supply line 617 couples the supply reservoir 605 to the backup reservoir 650, allowing the supply reservoir 605 to supply air to the backup reservoir 650 directly (i.e., not through the primary and secondary reservoirs 610, 620). The supply reservoir 605 or supply line 617 can contain a check valve (or equivalent devices, such as pressure protection valves to each reservoir) to prevent the backup reservoir 650 from draining via the supply reservoir 605 when there is a leak in the primary or secondary reservoirs 610, 620. Additionally, a check valve 648 is positioned between the backup reservoir 650 and the valve 645 to prevent pressurized air from flowing from the valve 645 to the backup reservoir 650 (to prevent the primary or secondary reservoirs 610, 620 from draining through a leaky backup reservoir 650).

There are many other alternatives that can be used with these embodiments. For example, while these embodiments were described in the context of pressurized air and pneumatic communication, other types of fluids (e.g., gases or liquids) can be used, with the various components being used or modified for the appropriate type of fluidic communication (e.g., hydraulic communication). In yet another alternative, supply lines can be placed off of the backup reservoir to supply pressurize air from the backup reservoir to various breaking components directly (i.e., without going through the primary and secondary reservoirs). In this alternative, the backup reservoir would be more than an accumulator to backflow into the primary and secondary reservoirs.

Figure 7:
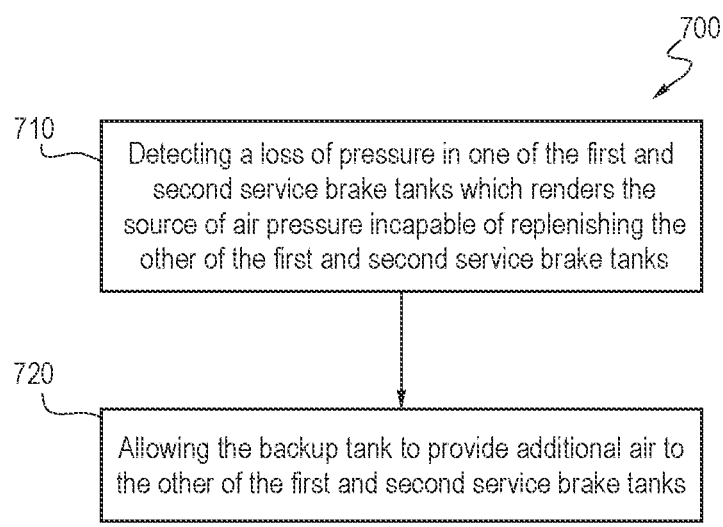
FIG. 7 is a flow chart of a method of an embodiment.

Also, it should be understood that the above components can be used in various methods. For example, a method for installing the components can be used in which the various components are arranged as discussed above. As another example, a method can be provided that is performed in a braking sub-system comprising a first service brake tank, a second service brake tank, a source of air pressure, and a backup tank. As shown in the flow chart 700 in FIG. 7, this method comprises detecting a loss of pressure in one of the first and second service brake tanks which renders the source of air pressure incapable of replenishing the other of the first and second service brake tanks (act 710); and allowing the backup tank to provide additional air to the other of the first and second service brake tanks (act 720). The detection can be done electronically or non-electronically.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A braking sub-system comprising:
   a first air reservoir coupled with a first braking circuit of a vehicle;
   a second air reservoir coupled with a second braking circuit of the vehicle;
   an air supply reservoir coupled with the first and second air reservoirs; and
   a backup air supply reservoir coupled with the first and second air reservoirs via a valve, wherein the valve is configured to provide air from the backup air supply reservoir to whichever one of the first and second air reservoirs contains air under a higher pressure.

2. The braking sub-system of claim 1, wherein the valve comprises a select-high valve.

3. The braking sub-system of claim 1, wherein the backup air supply reservoir is further coupled to each of the first and second air reservoirs via respective orifice check valves, wherein the orifice check valves are configured to allow air to flow from the first and second air reservoirs to the backup air supply reservoir at a slower rate than air is allowed to flow from the backup air supply reservoir to the first and second air reservoirs.

4. The braking sub-system of claim 1, wherein the backup air supply reservoir is further coupled to each of the first and second air reservoirs via respective pressure protection valves, wherein the pressure protection valves are configured to allow air to flow freely from the backup air supply to the first and second air reservoirs but allow air to flow from the first and second air reservoirs to the backup air supply reservoir only when the first and second air reservoirs contains air under a pressure greater than a threshold pressure.

5. The braking sub-system of claim 1, wherein the backup air supply reservoir is further coupled to each of the first and second air reservoirs via respective pilot-controlled shut-off valves, wherein the pilot-controlled shut-off valves are configured to allow air to flow freely from the backup air supply to the first and second air reservoirs but allow air to flow from the first and second air reservoirs to the backup air supply reservoir only when the first and second air reservoirs contains air under a pressure greater than a threshold pressure.

6. The braking sub-system of claim 1, wherein the backup air supply reservoir is further coupled to the first and second air reservoirs via a pressure protection valve positioned between the valve and the backup air supply reservoir, wherein the pressure protection valve is configured to allow air to flow freely from the backup air supply reservoir to the valve but allow air to flow from the valve to the backup air supply reservoir only in response to air pressure received from the valve by the pressure protection valve exceeding a threshold pressure.

7. The braking sub-system of claim 1, wherein the backup air supply reservoir is coupled with the air supply reservoir, and wherein a check valve is positioned between the backup air supply reservoir and the valve and is configured to prevent air from flowing from the valve to the backup air supply reservoir.

8. A method comprising:
performing the following in a braking sub-system comprising a first service brake tank, a second service brake tank, a source of air pressure, and a backup tank:
detecting a loss of pressure in one of the first and second service brake tanks which renders the source of air pressure incapable of replenishing the other of the first and second service brake tanks; and
allowing the backup tank to provide additional air to the other of the first and second service brake tanks.

9. The method of claim 8, wherein the method is performed by a valve configured to place the backup tank in fluidic communication with whichever one of the first and second service brake tanks is under a higher pressure.

10. The method of claim 9, wherein the valve comprises a select-high valve.

11. The method of claim 8, further comprising at least partially impeding flow from the first and second service brake tanks to the backup tank.

12. The method of claim 11, wherein the flow is at least partially impeded using one or more orifice check valves.

13. The method of claim 11, wherein the flow is at least partially impeded using one or more pressure protection valves.

14. The method of claim 11, wherein the flow is at least partially impeded using one or more shut-off valves.

15. The method of claim 8, further comprising using the first and second service brake tanks to fill the backup tank.

16. The method of claim 8, further comprising using the supply tank or source of air pressure to fill the backup tank.

17. A braking sub-system comprising:
a backup reservoir configured to be shared by primary and secondary reservoirs that are couplable with respective primary and secondary braking circuits of a vehicle; and
means for placing the backup reservoir in fluidic communication with only one of the primary and secondary reservoirs when the other of the primary and secondary reservoirs is subject to a leak.

18. The braking sub-system of claim 17, wherein the means for placing comprises a select-high valve.

19. The braking sub-system of claim 17, further comprising means for at least partially impeding flow from the primary and secondary reservoirs to the backup reservoir.

20. The braking sub-system of claim 17, further comprising the primary and secondary reservoirs.

* * * * *